A. DIXON.
TRAP.
APPLICATION FILED DEC. 18, 1911.
1,036,084.
Patented Aug. 20, 1912.
2 SHEETS—SHEET 2.
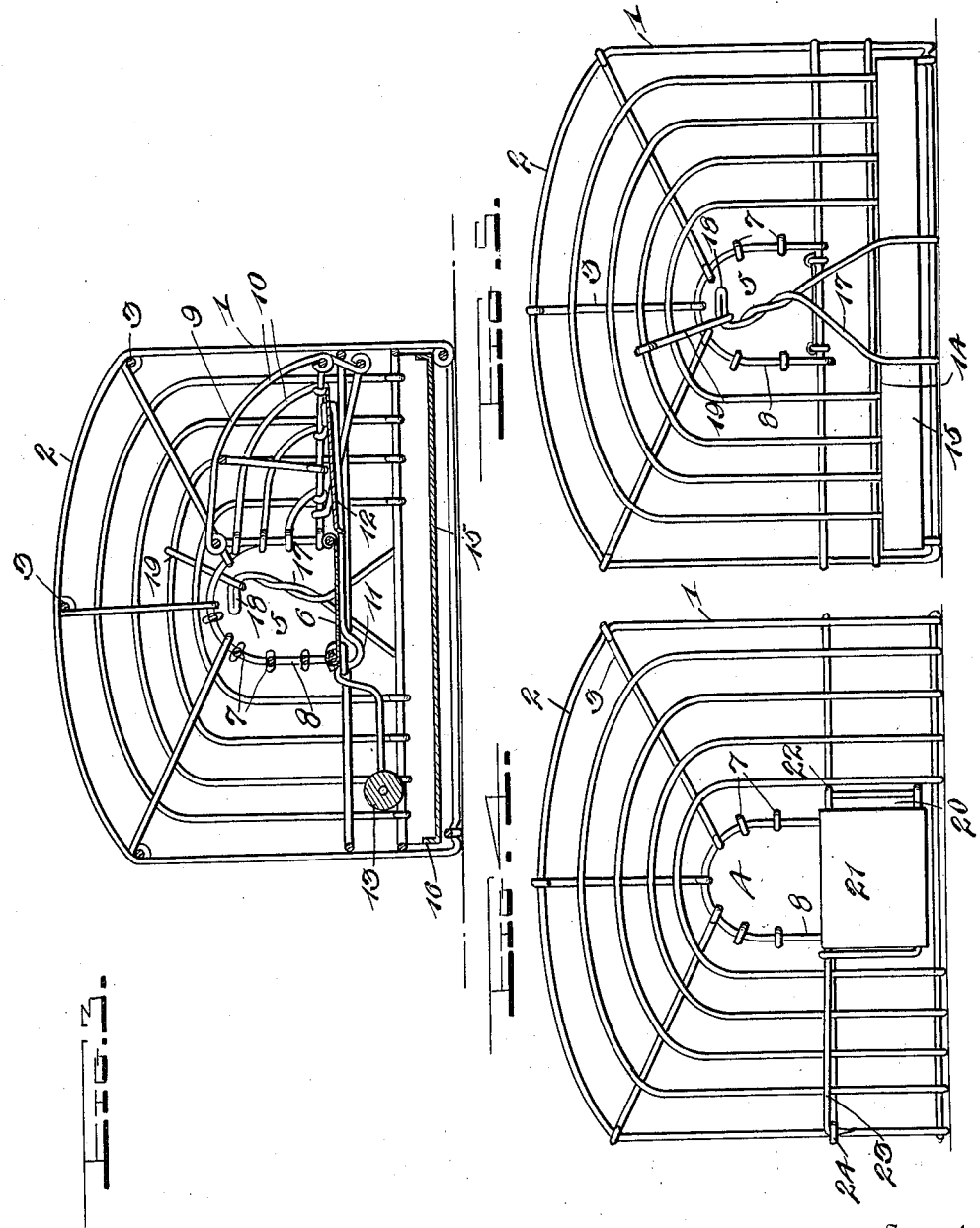
Witnesses
Chas. L. Grieshauer.
A. B. Norton.
Inventor
Allen Dixon,
By Watson E. Coleman.
Attorney

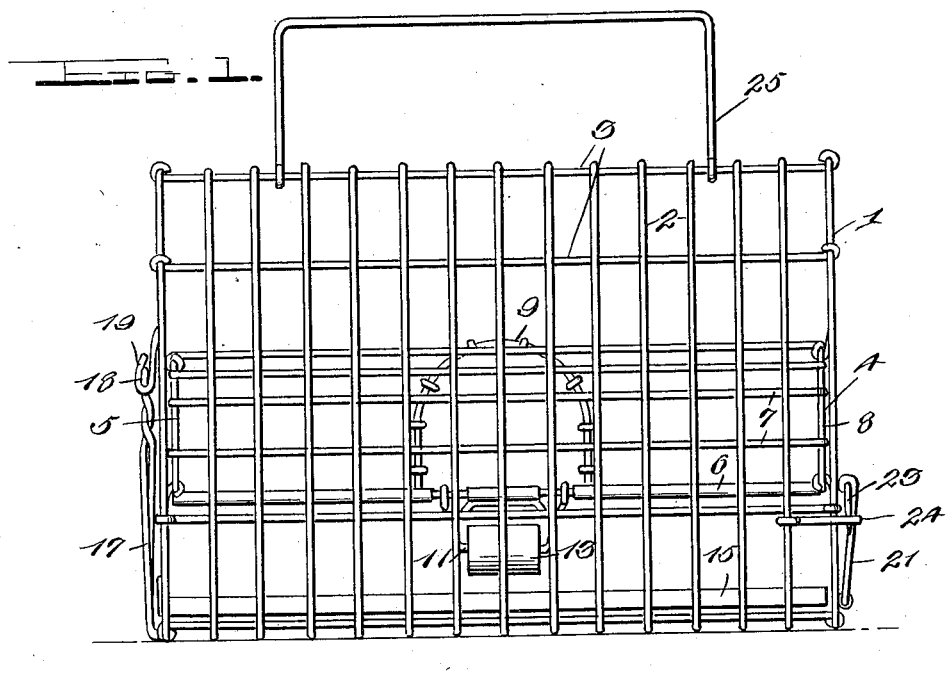
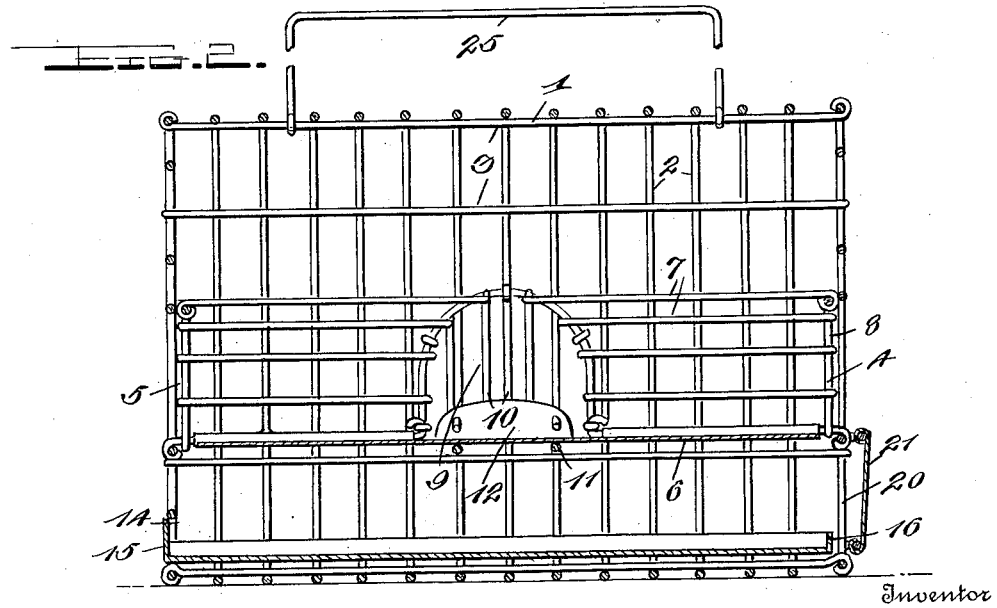

UNITED STATES PATENT OFFICE.

ALLEN DIXON, OF NASHVILLE, TENNESSEE, ASSIGNOR OF ONE-HALF TO CHARLES T. WILLIAMS, OF NASHVILLE, TENNESSEE.

TRAP.

1,036,084.  Specification of Letters Patent.  Patented Aug. 20, 1912.

Application filed December 18, 1911. Serial No. 666,333.

*To all whom it may concern:*

Be it known that I, ALLEN DIXON, a citizen of the United States, residing at Nashville, in the county of Davidson and State of Tennessee, have invented certain new and useful Improvements in Traps, of which the following is a specification, reference being had to the accompanying drawings.

My invention relates to new and useful improvements in the art of fishing and trapping and more particularly to a trap for catching small animals such as mice and rats, and my object is to provide a device of such construction as to permit the animal to observe the bait therein from any position outside of the trap, and when entering to approach the bait, will be positively trapped.

A further object of the invention resides in providing a platform or the like which is held in its normal position by means of a weight and which is adapted to be lowered upon a weight being applied thereon, such as the weight of a mouse or the like, to overcome the balancing weight.

Another object of the invention resides in providing a device which is extremely simple and durable in construction, inexpensive to manufacture, and one which will be efficient and useful in operation.

With these and other objects in view, my invention consists in the novel features of construction, combination and arrangement of parts as will be hereinafter referred to and more particularly pointed out in the specification and claims.

In the accompanying drawings forming a part of this application, Figure 1 is a side elevation. Fig. 2 is a longitudinal section therethrough. Fig. 3 is a transverse section through the same. Fig. 4 is an end elevation thereof, and, Fig. 5 is the opposite end elevation of the same.

In carrying out my invention, I shall refer to the drawings in which similar reference characters designate corresponding parts throughout the several views and in which—

1 indicates a body portion or housing formed of wires 2 designed somewhat arcuately, said wires being braced by the longitudinal wires 3 which also extend transversely across the ends of the device. Openings 4 and 5 are, respectively, provided in the ends of said housing, said openings being alined with one another, and extending longitudinally through the housing from one opening to the other, is a run-way 6 which, due to the position of the openings, is disposed a short distance above the base of said housing. This run-way consists of a base plate extending the full length of the device and an encircling wall therefor composed of a plurality of wires extending longitudinally of the device and engaged with the arcuate wires 8 secured to the end walls of said housing.

Communicating with the passage-way formed by the run-way 6 and the wall encircling the same, is an internal housing 9 formed by the wires 10 extending from the wall of the run-way 6 to the one side wall of the device, this internal housing being adapted to receive any desired form of bait. This internal housing is provided with no permanent base or flooring, and a pair of arms 11 which are pivotally mounted intermediate of their ends to the under face of the run-way 6, have the one ends thereof engaged with a plate or the like 12 which is adapted to form a temporary base or flooring for this internal housing when said plate is in a substantially horizontal position, and extending laterally from the runway 6. The opposite ends of these arms 11 have mounted thereon, a weight 13 which is just sufficient to over balance the weight of the plate 12 so as to normally retain said plate in its substantially horizontal position, whereby the same will form a substantial trap-door within the device, and it will be appreciated that when any weight is placed on the plate or trap-door 12, sufficient to overcome the weight 13, said plate will drop downwardly to pass all objects or the like to the compartment therebelow.

The one end wall of the device is provided with an opening or slot 14 which extends the full width of the device and into which is adapted to be inserted a removable metal flooring 15, the side and end edges of which are bent upwardly, as shown at 16, and in order to retain said flooring in position and at the same time form a closure for the opening 5 in the one end wall of the device, I provide a member 17 formed of a strand of wire bent in itself and twisted to permit the free ends of the same to be hinged on one of the transverse wires of the base of the device, while the free end thereof is formed into a hook 18 adapted to be engaged with a keeper or the like 19 carried on the one end wall of the housing. When properly placed in position, the member 17 will retain the metal flooring or base in position and simultaneously extend across the opening 5 to prevent the entrance or exit of animals therethrough. The opposite end wall of the device having the opening 4 therein is provided with an additional opening 20 immediately below said opening 5, whereby all animals on said metal base 15 may be removed therethrough, and a metal door 21 is provided which is braced by means of wires 22 hinged to the end wall of the device to form a closure for said opening. In order to retain said closure in its effective position over the opening 20, the door is provided with an arm 23 which is adapted to be engaged with a keeper 24 on the side wall of the device. This housing or trap 1 may be of any desired size, and in order that the same may be readily carried from place to place, a handle member 25 is provided which is pivotally carried on one of the longitudinal brace wires 3 of the device.

In practice, it will be seen that the device, after being properly set up, is provided with bait, which is placed in the internal housing or frame-work where the same may be readily observed by all animals on the outside of the housing, such as rats, mice and the like. The animals lured by the bait within the housing will enter the one opening 4 and pass along the run-way 6, and finding that in order to obtain the bait, they must step upon the plate 12, they will readily do so without suspicion. As soon as the weight of the animal is placed upon the plate or trap-door 12, the same will give away and the animal will drop to the metal flooring 15 in the compartment below, whereupon the trap-door 12 will return to its normal position. There being no way of escape from the device, after being once dropped in this compartment, the animal will be successfully trapped, whereupon the device may be carried by the owner to a convenient place for either removing the animal or drowning the same by submerging the device completely in water. The animals may be removed from the device by removing the door 21 from its closed position and withdrawing said animals through the opening 20, and the device may then be set for further trapping.

From the foregoing, it will be seen that I have provided a simple, inexpensive and efficient device for carrying out the objects of the invention, and while I have particularly described the features and elements which are most well adapted to perform the functions set forth, it is obvious that various changes in form, proportion and in the minor details of construction may be resorted to without departing from the spirit or sacrificing any of the principles of the invention.

What I claim is:—

1. A trap of the class described, comprising a housing formed of wire having alining openings in the ends thereof, a run-way connecting said openings, an arcuate wall for said run-way formed of a plurality of wires, a frame-work forming a lateral extension for said last referred to wall, a counter-poised trap-door carried on said run-way and forming a substantial floor for the extension formed by said frame-work and means carried on said housing adapted to form a closure for one of said openings therein.

2. A trap of the class described, comprising a housing formed of wire and provided with alining openings in the ends thereof, a run-way connecting said openings, a wall for the run-way, comprising a plurality of wires extending longitudinally of the device, a lateral extension communicating with the passage-way formed by said run-way and wall therefor, a wall for said extension formed of a plurality of wires extending from the wall of the run-way to the one side wall of the housing, a counter-poised trap-door pivotally mounted on the under face of said run-way and forming a substantial flooring for the lateral extension, means carried on said housing to form a closure for the opening in the one end wall of the housing and means whereby entrapped animals may be extracted from the device.

3. In a trap of the class described, a housing formed of wire having alining openings in the ends thereof, a run-way connecting said openings, a circular wall for the run-way formed of wires extending longitudinally the length of said housing, a removable flooring for the housing, a lateral extension comprising a plurality of wires extending from the wall of the run-way to the one side wall of the housing, said extension communicating with the passage-way formed by said run-way and wall, a counter-poised trap-door pivotally carried on the under face of said run-way forming a substantial flooring for the extension, and means to retain said removable flooring in position in the housing, said means being also adapted to form a closure for the opening in the one end wall of the housing.

4. A trap of the class described comprising a housing formed of wire, the end walls of which are provided with a pair of alining openings, a run-way extending longitudinally of the device and connecting said openings, said run-way comprising a base plate and a wall therefor composed of longitudinal wires partially encircling the same, a lateral extension communicating with the run-way, said extension being formed of a plurality of wires extending from the wall of said run-way to the wall of the housing, a counter-poised trap door pivotally carried on the base of said runway and forming a substantial flooring for
5 the lateral extension, a removable flooring slidably arranged between the sides of the device and the bottom thereof, a member hingedly carried on the lower portion of the housing and adapted to be disposed across
10 one of the openings formed in the ends of said housing, and means to retain said member in its position across said openings, whereby the same will form a substantial closure therefor.

In testimony whereof I hereunto affix my 15 signature in the presence of two witnesses.

ALLEN DIXON.

Witnesses:
  JAMES M. MOORE,
  H. ALLEN.

Copies of this patent may be obtained for five cents each, by addressing the "Commissioner of Patents, Washington, D. C."